US012782541B2

(12) United States Patent
Takahashi

(10) Patent No.: US 12,782,541 B2
(45) **Date of Patent: *Nov. 3, 2026**

(54) MIMO RADAR SIGNAL PROCESSING DEVICE AND RECEPTION SIGNAL PROCESSING DEVICE, AND METHOD FOR DISTINGUISHING PROPAGATION MODE OF RECEPTION SIGNAL VECTOR OF INTEREST

(71) Applicant: Mitsubishi Electric Corporation, Tokyo (JP)

(72) Inventor: Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 18/393,801

(22) Filed: Dec. 22, 2023

(65) Prior Publication Data

US 2024/0134028 A1 Apr. 25, 2024

Related U.S. Application Data

(63) Continuation of application No. PCT/JP2021/030093, filed on Aug. 18, 2021.

(51) Int. Cl.
*G01S 13/48* (2006.01)
*G01S 13/46* (2006.01)

(52) U.S. Cl.
CPC ......... *G01S 13/48* (2013.01); *G01S 2013/462* (2013.01)

(58) Field of Classification Search
CPC ........................... G01S 13/46; G01S 2013/462
See application file for complete search history.

(56) References Cited

U.S. PATENT DOCUMENTS 10,101,440 B2 * 10/2018 Kato .................... H01Q 21/061
2005/0270227 A1 * 12/2005 Stephens ............... G01S 5/0273 342/146

(Continued)

FOREIGN PATENT DOCUMENTS

CN 108139474 A 6/2018
JP 2017-116425 A 6/2017

(Continued)

OTHER PUBLICATIONS

Longman, Oren, Shahar Villeval, and Igal Bilik. "Multipath ghost targets mitigation in automotive environments." 2021 IEEE Radar Conference (RadarConf21). IEEE, 2021. (Year: 2021).*

(Continued)

*Primary Examiner* — Nazra Nur Waheed
(74) *Attorney, Agent, or Firm* — Birch, Stewart, Kolasch & Birch, LLP

(57) ABSTRACT

A MIMO radar signal processing device includes a plurality of matched filter banks to receive reception signals from a plurality of reception antennas and transmission signals from a plurality of transmission signal generating units and output matched filter outputs serving as vector elements of reception signal vectors, and a bidirectional angle measuring unit to obtain a bidirectional measured angle value constituted by a direction-of-departure and a direction-of-arrival in the reception signal vector of interest corresponding to a range Doppler cell given in target detection processing among the reception signal vectors for the matched filter outputs output from the plurality of matched filter banks.

9 Claims, 2 Drawing Sheets

(56) References Cited

U.S. PATENT DOCUMENTS

| | | | | |
|---|---|---|---|---|
| 2015/0355322 | A1* | 12/2015 | Oshima | G01S 13/003 342/116 |
| 2017/0029107 | A1 | 2/2017 | Emami et al. | |
| 2017/0141830 | A1 | 5/2017 | Cheng et al. | |
| 2017/0142605 | A1 | 5/2017 | Cheng et al. | |
| 2017/0222315 | A1 | 8/2017 | Hozouri | |
| 2018/0210075 | A1 | 7/2018 | Kim et al. | |
| 2019/0120954 | A1 | 4/2019 | Kim et al. | |
| 2019/0369223 | A1 | 12/2019 | Yoshida et al. | |
| 2020/0136250 | A1 | 4/2020 | Cohen et al. | |
| 2020/0166622 | A1* | 5/2020 | Small | G01S 13/4454 |
| 2020/0292690 | A1 | 9/2020 | Kim et al. | |
| 2020/0363522 | A1* | 11/2020 | Ishikawa | G01S 7/403 |
| 2021/0018592 | A1 | 1/2021 | Laghezza et al. | |
| 2021/0028826 | A1 | 1/2021 | Takahashi | |
| 2022/0214425 | A1* | 7/2022 | Yoffe | G01S 13/584 |
| 2022/0244370 | A1* | 8/2022 | Zhang | G01S 13/003 |
| 2024/0142599 | A1* | 5/2024 | Takahashi | G01S 13/426 |

FOREIGN PATENT DOCUMENTS

| | | | |
|---|---|---|---|
| JP | 2018-136232 | A | 8/2018 |
| JP | 2018/154748 | A1 | 8/2018 |
| JP | 2019/155625 | A1 | 8/2019 |
| JP | 2020-186973 | A | 11/2020 |
| WO | WO 2017/019571 | A1 | 2/2017 |

OTHER PUBLICATIONS

Liu, Chenwen, et al. "Multipath propagation analysis and ghost target removal for FMCW automotive radars." IET International Radar Conference (IET IRC 2020). vol. 2020. IET, 2020. (Year: 2020).*

Extended European Search Report for European Application No. 21954161.2, dated Jul. 10, 2024.

International Search Report (PCT/ISA/210) issued in PCT/JP2021/030093 mailed on Oct. 26, 2021.

Baidoo et al., "Joint DOD and DOA estimation using tensor reconstruction based sparse representation approach for bistatic MIMO radar with unknown noise effect," Signal Processing, vol. 182, 107912, 2021, pp. 1-11.

Indian Office Action and Search Report for Indian Application No. 202447008843, dated Oct. 13, 2025, with English translation.

Li et al., "Separate DOD and DOA Estimation for Bistatic MIMO Radar," International Journal of Antennas and Propagation, vol. 2016, Article ID 9170403, pp. 1-11 (12 pages total).

Liu et al., "DOA estimation method for multi-path targets based on TR MIMO radar," The Journal of Engineering, vol. 2019, Issue 2, 2019, pp. 461-465.

Indian Office Action and Search Report for Indian Application No. 202447009563, dated May 6, 2026, with English translation.

Canadian Office Action and Search Report for Canadian Application No. 3,222,878, dated Jan. 28, 2026.

Chinese Office Action and Search Report for Chinese Application No. 202180101215.0, dated Mar. 25, 2026, with English translation of the Office Action.

Chinese Office Action and Search Report for Chinese Application No. 202180101456.5, dated Mar. 26, 2026, with English translation of the Office Action.

U.S. Office Action for U.S. Appl. No. 18/390,857, dated Nov. 13, 2025.

* cited by examiner

MIMO RADAR SIGNAL PROCESSING DEVICE AND RECEPTION SIGNAL PROCESSING DEVICE, AND METHOD FOR DISTINGUISHING PROPAGATION MODE OF RECEPTION SIGNAL VECTOR OF INTEREST

CROSS REFERENCE TO RELATED APPLICATIONS

This application is a Continuation of PCT International Application No. PCT/JP2021/030093 filed on Aug. 18, 2021, which is hereby expressly incorporated by reference into the present application.

TECHNICAL FIELD

The present disclosure relates to a multiple input multiple output (MIMO) radar signal processing device that outputs different transmission signals to each of a plurality of transmission antennas, receives reception signals from a plurality of reception antennas that capture, as arrival waves, reflected waves obtained by transmission waves transmitted from the transmission antennas, reaching an object and being reflected, and obtain, from the received reception signals, a bidirectional measured angle value constituted by a direction-of-departure and a direction-of-arrival in a reception signal vector of interest.

BACKGROUND ART

As a path of an arrival wave in the MIMO radar device, in addition to a direct propagation mode in which a path (outward path) through which a transmission wave from the MIMO radar device reaches an object and a path (return path) through which a reflected wave from the object reaches the MIMO radar device coincide with each other, there is a multipath propagation mode in which the outward path and the return path do not coincide with each other.

Therefore, in the MIMO radar signal processing device in the MIMO radar device, it is necessary to distinguish whether the reception signal is in the direct propagation mode or the multipath propagation mode.

Patent Literature 1 discloses a signal processing device that determines whether or not an estimation result of an arrival direction is correct on the basis of a residual signal that is a difference between a reception signal of an antenna and an estimated reception signal calculated on the basis of estimation of an arrival direction of a radio wave calculated on the basis of reception signals of a plurality of antennas, and suppresses erroneous detection of an object.

CITATION LIST

Patent Literature

Patent Literature 1: JP 2020-186973 A

SUMMARY OF INVENTION

Technical Problem

However, in the signal processing device disclosed in Patent Literature 1, although the estimated reception signal is calculated using the arrival angle of the arrival wave, it is not possible to accurately grasp the propagation environment sensed by the MIMO radar device, that is, the propagation environment in the radio wave irradiation range, and thus, it is desired to be able to distinguish the direct propagation mode with higher accuracy.

The present disclosure has been made in view of the above points, and it is an object of the present disclosure to provide a MIMO radar signal processing device that can distinguish, for example, which of a direct propagation mode and a multipath propagation mode is the propagation mode with higher accuracy and obtain a bidirectional measured angle value that can be used to distinguish the propagation mode.

Solution to Problem

A MIMO radar signal processing device according to the present disclosure includes: a plurality of transmission signal generators to generate transmission signals different from each other and output the generated transmission signals to corresponding transmission antennas; a plurality of matched filter banks, each receiving a reception signal from a reception antenna corresponding to each of a plurality of reception antennas that capture reflected waves obtained by transmission waves transmitted from the transmission antennas, reaching an object and being reflected as arrival waves and transmission signals from the plurality of transmission signal generators, and outputting matched filter outputs serving as vector elements of reception signal vectors using the transmission signals from the plurality of transmission signal generators as a replica of a matched filter; and a bidirectional angle measurer to obtain a bidirectional measured angle value constituted by a direction-of-departure and a direction-of-arrival in a reception signal vector of interest corresponding to a range Doppler cell given in target detection processing among reception signal vectors for matched filter outputs from the plurality of matched filter banks.

Advantageous Effects of Invention

According to the present disclosure, since the bidirectional measured angle value constituted by the direction-of-departure and the direction-of-arrival in the reception signal vector of interest is obtained, for example, when the bidirectional measured angle value is used for distinguishing which one of the direct propagation mode and the multipath propagation mode is used, it is possible to distinguish the propagation mode with higher accuracy, and grasp the propagation environment sensed by the MIMO radar device in more detail.

DESCRIPTION OF EMBODIMENTS

First Embodiment

Figure 1:
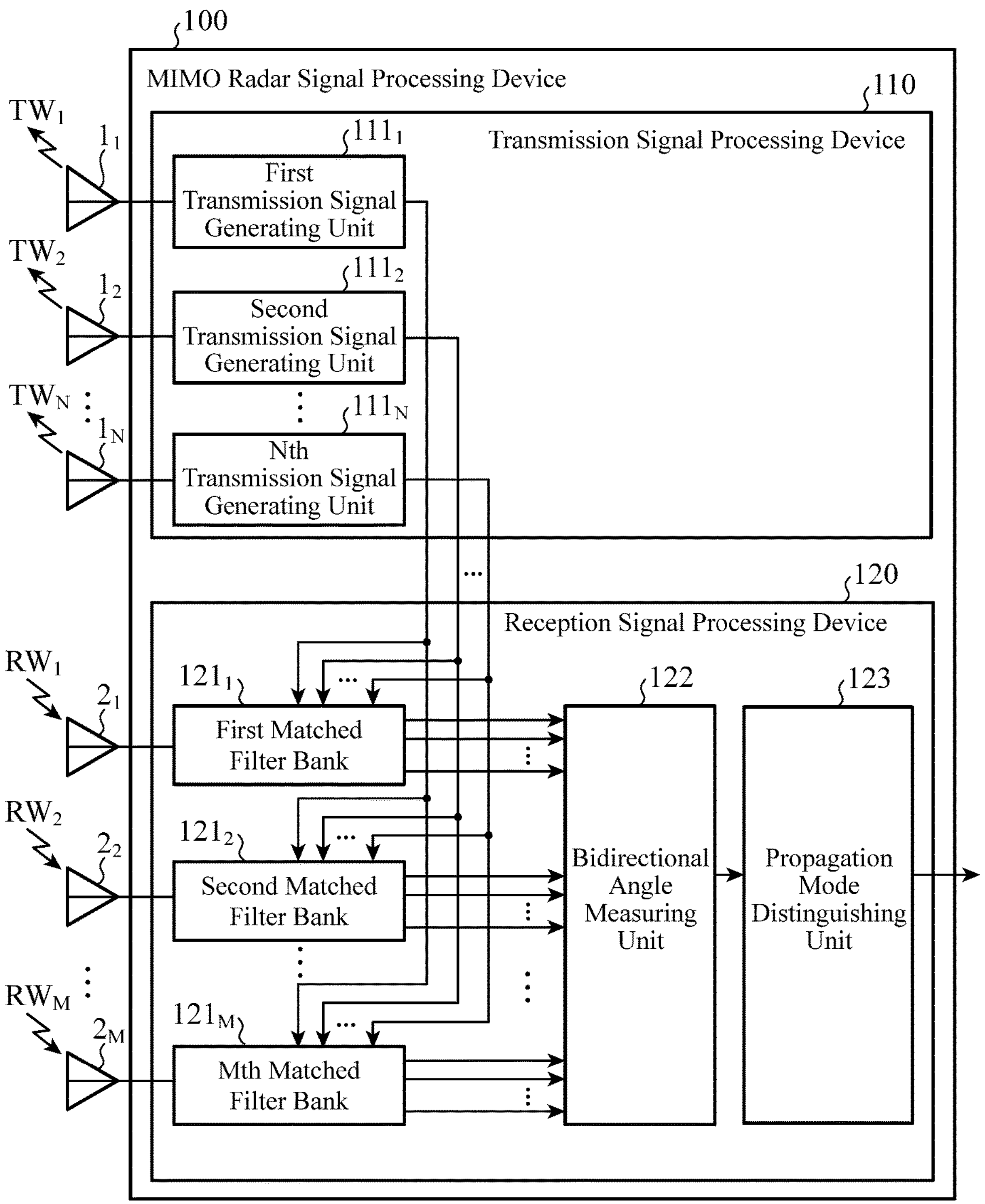
FIG. 1 is an overall configuration diagram illustrating a MIMO radar device according to a first embodiment.

A MIMO radar device according to a first embodiment will be described with reference to FIG. 1.

The MIMO radar device includes a plurality of transmission antennas 1, that is, first transmission antenna $\mathbf{1}_1$ to Nth transmission antenna $\mathbf{1}_N$, a plurality of reception antennas 2, that is, first reception antenna $\mathbf{2}_1$ to Mth reception antenna $\mathbf{2}_M$, and a MIMO radar signal processing device 100.

Each of N and M is a natural number equal to or more than two.

The MIMO radar signal processing device 100 includes a transmission signal processing device 110 and a reception signal processing device 120.

The transmission signal processing device 110 includes a plurality of transmission signal generating units 111, that is, a first transmission signal generating unit $\mathbf{111}_1$ to an Nth transmission signal generating unit $\mathbf{111}_N$.

The reception signal processing device 120 includes a plurality of matched filter banks 121, that is, a first matched filter bank $\mathbf{121}_1$ to an Mth matched filter bank $\mathbf{121}_M$, a bidirectional angle measuring unit 122, and a propagation mode distinguishing unit 123.

Each of the first transmission antenna $\mathbf{1}_1$ to the Nth transmission antenna $\mathbf{1}_N$ receives a transmission signal from the corresponding first transmission signal generating unit $\mathbf{111}_1$ to the Nth transmission signal generating unit $\mathbf{111}_N$, converts the transmission signal into a transmission wave, and transmits, that is, radiates different transmission waves $TW_1$ to $TW_N$.

The first transmission antenna $\mathbf{1}_1$ to the Nth transmission antenna $\mathbf{1}_N$ are arranged at regular intervals on a straight line.

The first transmission wave $TW_1$ to Nth transmission wave $TW_N$ transmitted from the first transmission antenna $\mathbf{1}_1$ to Nth transmission antenna $\mathbf{1}_N$ are transmission waves of signals (orthogonal signals) orthogonal to each other. Being orthogonal to each other means, for example, not to interfere with each other due to differences in time, phase, frequency, sign, and the like.

Note that, in order to avoid complexity in the following description, when it is not necessary to distinguish the first transmission antenna $\mathbf{1}_1$ to the Nth transmission antenna $\mathbf{1}_N$ and the first transmission wave $TW_1$ to the Nth transmission wave $TW_N$, they will be described as the transmission antenna 1 and the transmission wave TW.

The first transmission signal generating unit $\mathbf{111}_1$ to the Nth transmission signal generating unit $\mathbf{111}_N$ are provided corresponding to the first transmission antenna $\mathbf{1}_1$ to the Nth transmission antenna $\mathbf{1}_N$, respectively, generate transmission signals different from each other, and output the generated transmission signals to the corresponding transmission antenna 1.

That is, the first transmission signal generating unit $\mathbf{111}_1$ generates a first transmission signal and outputs the first transmission signal to the corresponding first transmission antenna $\mathbf{1}_1$, the second transmission signal generating unit $\mathbf{111}_2$ generates a second transmission signal and outputs the second transmission signal to the corresponding second transmission antenna $\mathbf{1}_2$, and the Nth transmission signal generating unit $\mathbf{111}_N$ generates an Nth transmission signal and outputs the Nth transmission signal to the corresponding Nth transmission antenna $\mathbf{1}_N$. The first transmission signal to the Nth transmission signal are signals orthogonal to each other.

In addition, the first transmission signal generating unit $\mathbf{111}_1$ to the Nth transmission signal generating unit $\mathbf{111}_N$ output transmission signals to the first matched filter bank $\mathbf{121}_1$ to the Mth matched filter bank $\mathbf{121}_M$, respectively.

The first transmission signal generating unit $\mathbf{111}_1$ to the Nth transmission signal generating unit $\mathbf{111}_N$ are known transmission signal generating units, and a specific description thereof will be omitted.

In the following description, in order to avoid complexity, the first transmission signal generating unit $\mathbf{111}_1$ to the Nth transmission signal generating unit $\mathbf{111}_N$ will be described as the transmission signal generating unit 111 in a case where it is not necessary to distinguish and describe them.

The first reception antenna $\mathbf{2}_1$ to the Mth reception antenna $\mathbf{2}_M$ are arranged at regular intervals on a straight line.

The first reception antenna $\mathbf{2}_1$ to the Mth reception antenna $\mathbf{2}_M$ capture, as different arrival waves $RW_1$ to $RW_M$, respective reflected waves obtained by the transmission waves TW transmitted from the plurality of transmission antennas 1, reaching an object and being reflected, convert the arrival waves $RW_1$ to $RW_M$ into reception signals, and output the reception signals to the corresponding first matched filter bank $\mathbf{121}_1$ to the Mth matched filter bank $\mathbf{121}_M$.

Note that, in order to avoid complexity in the following description, the first reception antenna $\mathbf{2}_1$ to the Mth reception antenna $\mathbf{2}_M$ will be described as the reception antenna 2 in a case where it is not necessary to distinguish and describe them.

The first matched filter bank $\mathbf{121}_1$ to the Mth matched filter bank $\mathbf{121}_M$ are provided corresponding to the first reception antenna $\mathbf{2}_1$ to the Mth reception antenna $\mathbf{2}_M$, respectively.

Each of the first matched filter bank $\mathbf{121}_1$ to the Mth matched filter bank $\mathbf{121}_M$ receives the reception signal from the corresponding reception antenna 2 and the transmission signals from the plurality of transmission signal generating units 111.

Each of the first matched filter bank $\mathbf{121}_1$ to the Mth matched filter bank $\mathbf{121}_M$ includes matched filters, and obtains N matched filter outputs by using transmission signals from the plurality of transmission signal generating units 111 as a replica of the matched filter.

That is, from the first matched filter bank $\mathbf{121}_1$ to the Mth matched filter bank $\mathbf{121}_M$, M×N matched filter outputs, that is, M×N virtual reception signals are obtained by the M reception signals and the N transmission signals.

In other words, the first matched filter bank $\mathbf{121}_1$ to the Mth matched filter bank $\mathbf{121}_M$ are equivalent to those that convert arrival waves obtained by the M×N virtual reception antennas arranged at the same interval as the interval at which the plurality of transmission antennas 1 are arranged into reception signals and output the reception signals.

The matched filter outputs from the first matched filter hank $\mathbf{121}_1$ to the Mth matched filter bank $\mathbf{121}_M$ are vector elements of reception signal vectors in the virtual reception signals by the arrival waves obtained by the M×N virtual reception antennas.

Among these reception signal vectors, a reception signal vector corresponding to a predetermined range Doppler cell, that is, a range Doppler cell given in the target detection processing is a reception signal vector of interest x(i).

That is, the reception signal vector at the i-th snapshot in which the target detection processing is performed among the snapshots 1 to $N_S$ is the reception signal vector of interest $x(i)$ for each virtual reception antenna. An i is a snapshot number from 1 to $N_S$. $N_S$ is a natural number equal to or more than two.

The first matched filter bank $121_1$ to the Mth matched filter bank $121_M$ each operate by any one of a time division multiple access (TDMA) system, a code division multiple access (CDMA) system, a Doppler division multiple access (DDMA) system, and a frequency division multiple access (FDMA) system.

Provided that, the system is not limited to the specific system described above, and other systems may be used.

The first matched filter bank $121_1$ to the Mth matched filter bank $121_M$ are known matched filter banks, and a specific description thereof is omitted.

Note that, in order to avoid complexity in the following description, the first matched filter bank $121_1$ to the Mth matched filter bank $121_M$ will be described as the matched filter bank 121 in a case where it is not necessary to distinguish and describe them.

In addition, although the reception signal vector of interest x(i) is also present in all the M×N virtual reception antennas, in order to avoid complexity in the following description, description will be given focusing on one reception signal vector of interest x(i), but the same idea holds for the remaining reception signal vectors of interest x(i).

Before describing the bidirectional angle measuring unit 122 and the propagation mode distinguishing unit 123 which are the feature points in the first embodiment in the reception signal processing device 120, the reception signal vector of interest x(i) will be described.

Figure 2:
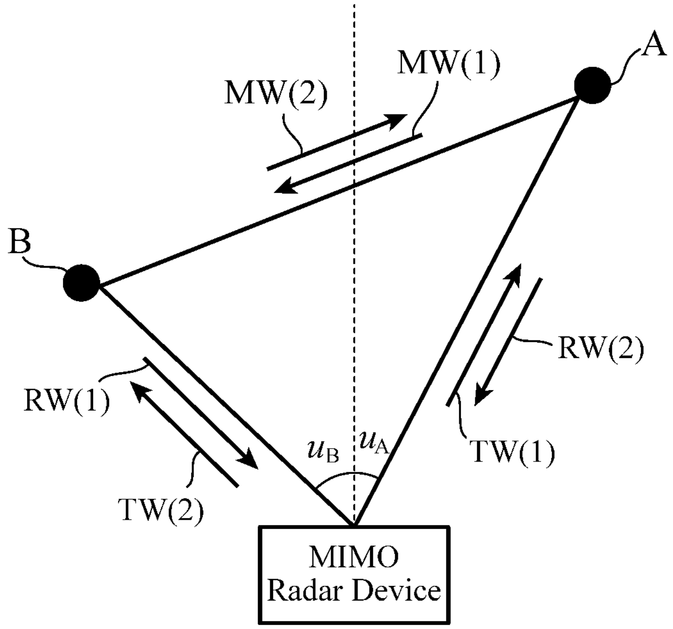
FIG. 2 is a diagram illustrating multipath propagation waves reflected twice in total once by different objects A and B within a radio wave irradiation range of the MIMO radar device.

First, as illustrated in FIG. 2, a reception signal vector of interest x(i) in the multipath propagation mode when there are different objects A and B within the radio wave irradiation range of the MIMO radar device and the reception antenna 2 captures the multipath propagation wave as an arrival wave will be described.

Note that the radio wave irradiation range of the MIMO radar device is a propagation environment sensed by the MIMO radar device.

Assuming that the propagation angle from the object A to the object B is ($u_A$, $u_B$) (with the proviso that $u_A \neq u_B$) and the propagation angle from the object B to the object A is ($u_B$, $u_A$) (with the proviso that $u_A \neq u_B$), propagation reflected once by each of the object A and the object B has two multipath propagation paths bidirectionally as indicated by arrows in FIG. 2 due to propagation reversibility, that is, a first multipath propagation path in a counterclockwise turn by TW(1)→MW(1)→RW(1) and a second multipath propagation path in a clockwise turn by TW(2)→MW(2)→RW(2).

Here, the propagation angle is an azimuth angle or an elevation angle and corresponds to an angle in a plane.

Needless to say, the propagation angle may be an angle in a space determined by the azimuth angle and the elevation angle.

In the following description, a case where the propagation angle corresponds to an angle in a plane by an azimuth angle or an elevation angle will be described, but the same applies to a case where the propagation angle is an angle in a space determined by the azimuth angle and the elevation angle.

The first multipath propagation path TW(1)→MW(1)→RW(1) is a counterclockwise multipath propagation path in which the transmission wave TW from the MIMO radar device is reflected by the object A, and the reflected wave is reflected by the object B to reach the MIMO radar device as the arrival wave RW.

The second multipath propagation path TW(2)→MW(2)→RW(2) is a clockwise multipath propagation path in which the transmission wave TW from the MIMO radar device is reflected by the object B, and the reflected wave is reflected by the object A to reach the MIMO radar device as the arrival wave RW.

Note that a multipath propagation path reflected by an object twice will be described, but the following description holds even if the multipath propagation path is reflected by the object three times or more.

In the first multipath propagation path, the propagation angle $u_A$ is the direction-of-departure (DOD), and the propagation angle $u_B$ is the direction-of-arrival (DOA). In the second multipath propagation path, the propagation angle $u_B$ is the direction-of-departure, and the propagation angle $u_A$ is the direction-of-arrival.

The reception signal vector of interest x(i) at this time is expressed by the following Equation (1).

$$\begin{aligned} x(i) &= a_{MIMO}(u_A, u_B)s(i) + a_{MIMO}(u_B, u_A)s(i) + n(i) \\ &= (a_{MIMO}(u_A, u_B) + a_{MIMO}(u_B, u_A))s(i) + n(i) \\ &= b(u_A, u_B)s(i) + n(i) \end{aligned} \tag{1}$$

In Equation (1), i is a snapshot number from one to $N_S$, s(i) is a complex amplitude of the reflected signal, n(i) is a receiver noise vector, $a_{MIMO}(u_A, u_B)$ is a virtual array steering vector corresponding to the direction-of-departure $u_A$ and the direction-of-arrival $u_B$ in the first multipath propagation path, $a_{MIMO}(u_B, u_A)$ is a virtual array steering vector corresponding to the direction-of-departure $u_B$ and the direction-of-arrival $u_A$ in the second multipath propagation path, and $b(u_A, u_B)$ is a multipath steering vector corresponding to the propagation angle ($u_A$, $u_B$).

The virtual array steering vector $a_{MIMO}(u_A, u_B)$ is given by a Kronecker product of the transmission array steering vector $a_T(u_A)$ and the reception array steering vector $a_R(u_B)$, and the virtual array steering vector $a_{MIMO}(u_B, u_A)$ is given by a Kronecker product of the transmission array steering vector $a_T(u_B)$ and the reception array steering vector $a_R(u_A)$, and is expressed by the following Equation (2).

$$\begin{aligned} a_{MIMO}(u_A, u_B) &= a_T(u_A) \otimes a_R(u_B) \\ a_{MIMO}(u_B, u_A) &= a_T(u_V) \otimes a_R(u_A) \end{aligned} \tag{2}$$

The multipath steering vector ($u_A$, $u_B$) in the above Equation (1) is expressed by the following Equation (3) in consideration of the above Equation (2).

$$\begin{aligned} b(u_A, u_B) &= a_{MIMO}(u_A, u_B) + a_{MIMO}(u_B, u_A) \\ &= a_T(u_A) \otimes a_R(u_B) + a_T(u_B) \otimes a_R(u_A) \end{aligned} \tag{3}$$

In addition, as is clear from the above Equation (3), the multipath steering vector $b(u_B, u_A)$ corresponding to the propagation angle ($u_B$, $u_A$) is equal to the multipath steering vector $b(u_A, u_B)$ corresponding to the propagation angle ($u_A$, $u_B$), and the following Equation (4) holds.

$$b(u_B, u_A) = b(u_A, u_B) \tag{4}$$

On the other hand, a correlation matrix $R_{XX}$ in the reception signal vector of interest x(i) is expressed by the following Equation (5).

$$\begin{aligned} R_{xx} &= \frac{1}{N_s}\sum_{i=1}^{N_s} x(i)x^H(i) \\ &= p_s b(u_A, u_B)b^H(u_A, u_B) + \sigma^2 I (N_s \to \infty) \\ &= p_s(a_{MIMO}(u_A, u_B) + a_{MIMO}(u_B, u_A)) \cdot \\ &\quad (a^H_{MIMO}(u_A, u_B) + a^H_{MIMO}(u_B, u_A)) + \sigma^2 I \\ &= p_s \begin{pmatrix} a_{MIMO}(u_A, u_B)a^H_{MIMO}(u_A, u_B) + \\ a_{MIMO}(u_A, u_B)a^H_{MIMO}(u_B, u_A) + \\ a_{MIMO}(u_B, u_A)a^H_{MIMO}(u_A, u_B) + \\ a_{MIMO}(u_B, u_A)a^H_{MIMO}(u_B, u_A) \end{pmatrix} + \sigma^2 I \\ &= R_{AB} + R^{(cross)}_{AB} + R_{BA} + \sigma^2 I \end{aligned} \tag{5}$$

In Equation (5), $P_S$ is a reflected signal power, $\sigma^2$ is a receiver noise power, $R_{AB}$ is an autocorrelation matrix of the multipath propagation wave in the first multipath propagation path, and $R_{BA}$ is an autocorrelation matrix of the multipath propagation wave in the second multipath propagation path.

The autocorrelation matrix $R_{AB}$ and the autocorrelation matrix $R_{BA}$ are expressed by the following Equation (6).

$$\begin{aligned} R_{AB} &= p_s a_{MIMO}(u_A, u_B)a^H_{MIMO}(u_A, u_B) \\ R_{BA} &= p_s a_{MIMO}(u_B, u_A)a^H_{MIMO}(u_B, u_A) \end{aligned} \tag{6}$$

A term on the right side in the above Equation (5) indicated in the following (7) is a cross-correlation matrix generated because multipath propagation waves in the first multipath propagation path and the second multipath propagation path are coherent.

$$R^{(cross)}_{AB} \tag{7}$$

The cross-correlation matrix expressed by the above (7) is expressed by the following Equation (8).

$$\begin{aligned} &R^{(cross)}_{AB} = \\ &p_s(a_{MIMO}(u_A, u_B)a^H_{MIMO}(u_B, u_A) + a_{MIMO}(u_B, u_A)a^H_{MIMO}(u_A, u_B)) \end{aligned} \tag{8}$$

That is, the cross-correlation matrix expressed by the above (7) is the sum of the correlation matrix affected from the second multipath propagation path in the first multipath propagation path and the correlation matrix affected from the first multipath propagation path in the second multipath propagation path, as shown in the above Equation (8).

Next, the reception signal vector of interest x(i) in the direct propagation mode in which the path (outward path) through which the transmission wave TW from the MIMO radar device reaches the object A and the path (return path) through which the arrival wave RW as a reflected wave from the object A reaches the MIMO radar device match will be described.

Since the direction-of-departure $u_A$ in the transmission wave and the direction-of-arrival $u_A$ in the arrival wave are the same, the reception signal vector of interest x(i) in the direct propagation mode is expressed by the following Equation (9).

$$x(i) = a_{MIMO}(u_A, u_A)s(i) + n(i) \tag{9}$$

Therefore, the correlation matrix $R_{XX}$ of the reception signal vector of interest x(i) by the direct propagation wave is expressed by the following Equation (10).

$$\begin{aligned} R_{xx} &= \frac{1}{N_s}\sum_{i=1}^{N} x(i)x^H(i) \\ &= p_s a_{MIMO}(u_A, u_A)a^H_{MIMO}(u_A, u_B) + \sigma^2 I (N \to \infty) \\ &= R_{AA} + \sigma^2 I \end{aligned} \tag{10}$$

In Equation (10), $R_{AA}$ is an autocorrelation matrix of a direct propagation wave in a direct propagation path for the object A, and is expressed by the following Equation (11).

$$R_{AA} = p_s a_{MIMO}(u_A, u_A)a^H_{MIMO}(u_A, u_A) \tag{11}$$

The autocorrelation matrix $R_{BB}$ of the direct propagation wave in the direct propagation mode in which the path (outward path) through which the transmission wave TW from the MIMO radar device reaches the object B coincides with the path (return path) through which the arrival wave RW that is the reflected wave from the object B reaches the MIMO radar device can also be expressed in the same manner as in the above Equation (11).

Next, the bidirectional angle measuring unit 122 and the propagation mode distinguishing unit 123 in the reception signal processing device 120 will be described.

The bidirectional angle measuring unit 122 calculates a bidirectional measured angle value ($u_A$, $u_B$) constituted by the direction-of-departure and the direction-of-arrival in the reception signal vector of interest x(i) corresponding to the range Doppler cell given in the target detection processing by the matched filter outputs from the plurality of matched filter banks 121.

Assuming that the matched filter outputs for the M×N virtual reception antennas input from the plurality of matched filter banks 121 are reception signals in the first direct propagation mode in the direct propagation path for the object A, the second direct propagation mode in the direct propagation path for the object B, the first multipath propagation mode in the first multipath propagation path, or the second multipath propagation mode in the second multipath propagation path, the bidirectional angle measuring unit 122 calculates bidirectional measured angle values ($u_A$, $u_B$) in the reception signal vector of interest x(i) for each of the matched filter outputs for the M×N virtual reception antennas as follows.

That is, the bidirectional measured angle values ($u_A$, $u_B$) in each of the reception signal vectors of interest x(i) by the bidirectional angle measuring unit 122 are calculated by obtaining the directional spectrum $P_C(u_1, u_2)$ of the beamformer method shown in the following Equation (12), and obtaining the propagation angle $u_1$ and the propagation angle $u_2$ at which the directional spectrum $P_C(u_1, u_2)$ has the maximum values as the direction-of-departure $u_{AMAX}$ and the direction-of-arrival $u_{BMAX}$ constituting the bidirectional measured angle value in the reception signal vector of interest x(i).

In short, in the following Equation (12), the virtual array steering vector $a_{MIMO}(u_A, u_B)$ is set as a variable, that is, the transmission array steering vector $a_T(u_A)$ and the reception array steering vector $a_R(u_B)$ constituting the virtual array steering vector $a_{MIMO}(u_A, u_B)$ are set as variables, and the propagation angle $u_1$ and the propagation angle $u_2$ at which the directional spectrum $P_C(u_1, u_2)$ has the maximum value are obtained as the direction-of-departure $u_{AMAX}$ and the direction-of-arrival $u_{BMAX}$ constituting the bidirectional measured angle value in the reception signal vector of interest x(i).

Provided that, the virtual array steering vector $a_{MIMO}(u_A, u_B)$ of the following Equation (12) includes not only the case of $u_A \neq u_B$ but also $u_A = u_B$.

$$(u_A, u_B) = \operatorname{argmax} P_c(u_1, u_2) \tag{12}$$

$$P_c(u_1, u_2) = \left| \frac{a^H_{MIMO}(u_1, u_2) R_{xx} a_{MIMO}(u_1, u_2)}{a^H_{MIMO}(u_1, u_2) a_{MIMO}(u_1, u_2)} \right|$$

As is clear from Equation (12), the directional spectrum $P_C(u_1, u_2)$ depends on the virtual array steering vector $a_{MIMO}(u_A, u_B)$, that is, the transmission array steering vector $a_T(u_A)$ and the reception array steering vector $a_R(u_B)$, and depends on the propagation angle $(u_1, u_2)$.

In Equation (12), $u_1$ is a scan angle indicating a direction-of-departure, and $u_2$ is a scan angle indicating a direction-of-arrival.

The directional spectrum $P_C(u_1, u_2)$ has a maximum value with respect to the reception signal vector of interest x(i) when the propagation angle $(u_1, u_2)$ indicates the propagation angle of the direct propagation mode in the direct propagation path or the propagation angle of the multipath propagation mode in the multipath propagation path.

That is, the bidirectional measured angle value $(u_{AMAX}, u_{BMAX})$ in which the direction-of-departure is $u_{AMAX}$ and the direction-of-arrival is $u_{BMAX}$ indicates whether the propagation mode of the reception signal vector of interest x(i) is the direct propagation mode or the multipath propagation mode.

In the above description, it has been described that the direction-of-departure is $u_A$ and the direction-of-arrival is $u_B$, but even if the direction-of-departure is $u_B$ and the direction-of-arrival is $u_A$, the bidirectional measured angle value can be obtained exactly the same.

In short, the bidirectional angle measuring unit 122 can obtain a bidirectional measured angle value in which the direction-of-departure is $u_{AMAX}$ and the direction-of-arrival is $u_{BMAX}$ for the reception signal vector of interest x(i) in each virtual reception antenna regardless of the direction-of-departure and the direction-of-arrival in the arrival wave to the virtual reception antenna.

Further, when there is a directional spectrum $P_C(u_1, u_2)$ indicating a plurality of local maximum points in the directional spectrum $P_C(u_1, u_2)$ obtained by using the direction-of-departure $u_1$ and the direction-of-arrival $u_2$ constituting the bidirectional measured angle value in each reception signal vector of interest x(i) as variables, the bidirectional angle measuring unit 122 obtains a difference $|u_1-u_2|$ between the direction-of-departure $u_1$ and the direction-of-arrival $u_2$ corresponding to each of the directional spectra $P_C(u_1, u_2)$ indicating a plurality of local maximum points, and obtains the direction-of-departure $u_1$ and the direction-of-arrival $u_2$ corresponding to the directional spectrum $P_C(u_1, u_2)$ in which the difference $|u_1-u_2|$ between the direction-of-departure $u_1$ and the direction-of-arrival $u_2$ indicates a minimum as the direction-of-departure $u_{AMAX}$ and the direction-of-arrival $u_{BMAX}$ constituting the bidirectional measured angle value in the reception signal vector of interest x(i).

Note that the bidirectional angle measuring unit 122 obtains the bidirectional measured angle value $(u_{AMAX}, u_{BMAX})$ by the beamformer method in the above example, but may obtain the bidirectional measured angle value $(u_{AMAX}, u_{BMAX})$ by the MUSIC method or the ESPRIT method.

The propagation mode distinguishing unit 123 distinguishes whether the propagation mode in the reception signal vector of interest x(i) for the bidirectional measured angle value obtained by the bidirectional angle measuring unit 122 is the direct propagation mode or the multipath propagation mode, and outputs the distinguished result.

The propagation mode distinguishing unit 123 obtains a difference $|u_{AMAX}-u_{BMAX}|$ between the direction-of-departure $u_{AMAX}$ and the direction-of-arrival $u_{BMAX}$ constituting the bidirectional measured angle value obtained by the bidirectional angle measuring unit 122, and compares the obtained difference $|u_{AMAX}-u_{BMAX}|$ with the threshold th.

Note that, in a case where there is a directional spectrum indicating a plurality of local maximum points in a directional spectrum obtained using the direction-of-departure $u_1$ and the direction-of-arrival $u_2$ as variables, a difference $|u_1-u_2|$ between the direction-of-departure $u_1$ and the direction-of-arrival $u_2$ is obtained by the bidirectional angle measuring unit 122 for the directional spectrum indicating the plurality of local maximum points, and the difference $|u_{AMAX}-u_{BMAX}|$ between the direction-of-departure $u_{AMAX}$ and the direction-of-arrival $u_{BMAX}$ constituting the bidirectional measured angle value in the reception signal vector of interest x(i) is obtained by the bidirectional angle measuring unit 122, the propagation mode distinguishing unit 123 compares the difference $|u_{AMAX}-u_{BMAX}|$ between the direction-of-departure $u_{AMAX}$ and the direction-of-arrival $u_{BMAX}$ obtained by the bidirectional angle measuring unit 122 with the threshold th.

When the difference $|u_{AMAX}-u_{BMAX}|$ is equal to or less than the threshold th, the propagation mode distinguishing unit 123 distinguishes that the propagation mode of the reception signal vector of interest x(i) is the direct propagation mode, and outputs a distinguished result indicating that the propagation mode is the direct propagation mode.

The difference $|u_{AMAX}-u_{BMAX}|$ being equal to or less than the threshold th means that the direction-of-departure $u_{AMAX}$ and the direction-of-arrival $u_{BMAX}$ are approximate or the same, and the propagation mode of the reception signal vector of interest x(i) is a direct propagation mode in which a path (outward path) through which the transmission wave TW from the MIMO radar device reaches the object and a path (return path) through which the arrival wave RW as a reflected wave from the object reaches the MIMO radar device coincide with each other.

On the other hand, when the difference $|u_{AMAX}-u_{BMAX}|$ exceeds the threshold th, the propagation mode distinguishing unit 123 distinguishes that the propagation mode of the reception signal vector of interest x(i) is the multipath propagation mode, and outputs a distinguished result indicating that the propagation mode is the multipath propagation mode.

The fact that the difference $|u_{AMAX}-u_{BMAX}|$ exceeds the threshold th means that there is a difference between the direction-of-departure $u_{AMAX}$ and the direction-of-arrival $u_{BMAX}$, and means that the propagation mode of the reception signal vector x(i) is a multipath propagation path in which the outward path and the return path of the propagation wave do not coincide with each other.

The bidirectional angle measuring unit 122 and the propagation mode distinguishing unit 123 are constituted by a microcomputer including a central processing unit (CPU) and memories such as a read only memory (ROM) and a random access memory (RAM).

Figure 3:
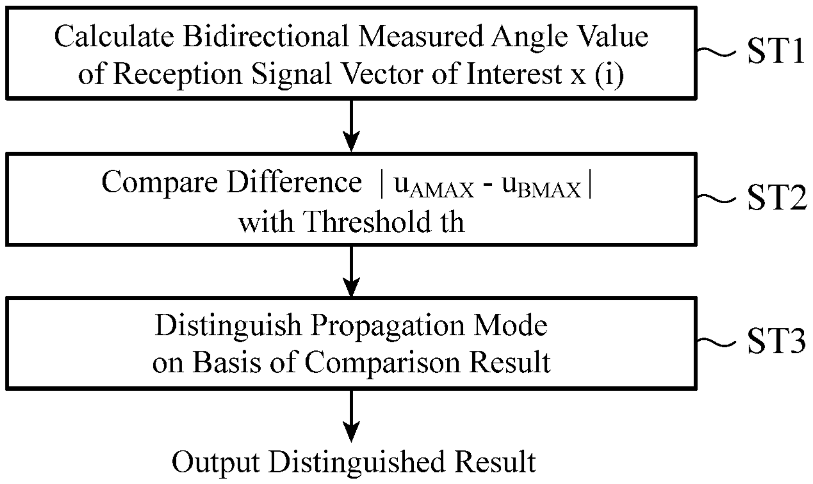
FIG. 3 is a flowchart illustrating a method for distinguishing a propagation mode of a reception signal vector of interest which is an operation of the reception signal processing device.

Next, a method for distinguishing a propagation mode of the reception signal vector of interest x(i), which is the operation of the MIMO radar signal processing device, particularly the reception signal processing device, will be described with reference to FIG. 3.

The arrival waves RW captured by the plurality of reception antennas 2 are converted into reception signals by the plurality of reception antennas 2, and the converted reception signals are input to the plurality of matched filter banks 121 corresponding to the plurality of reception antennas 2.

Each matched filter bank 121 outputs matched filter outputs as many as the number of input transmission signals by the reception signal from the corresponding reception antenna 2 and the transmission signals from the plurality of transmission signal generating units 111.

As illustrated in step ST1, the bidirectional angle measuring unit 122 to which the matched filter outputs output from the plurality of matched filter banks 121 are input calculates a bidirectional measured angle value ($u_{AMAX}$, $u_{BMAX}$) in the reception signal vector of interest x(i) for each matched filter output.

The bidirectional measured angle value ($u_{AMAX}$, $u_{BMAX}$) is obtained as a propagation angle ($u_{AMAX}$, $u_{BMAX}$) at which the directional spectrum $P_C(u_1, u_2)$ shown in the above Equation (12) has the maximum value.

Next, as described in step ST2, for each matched filter output, the propagation mode distinguishing unit 123 obtains a difference $|u_{AMAX}-u_{BMAX}|$ between direction-of-departure $u_{AMAX}$ and the direction-of-arrival $u_{BMAX}$ constituting the bidirectional measured angle value in the reception signal vector of interest x(i) calculated by the bidirectional angle measuring unit 122, and compares the obtained difference $|u_{AMAX}-u_{BMAX}|$ with the threshold th.

As illustrated in step ST3, the propagation mode distinguishing unit 123 distinguishes the propagation mode of the reception signal vector of interest x(i) on the basis of the comparison result.

The propagation mode distinguishing unit 123 outputs a distinguished result indicating that the propagation mode is a direct propagation mode when the difference $|u_{AMAX}-u_{BMAX}|$ is equal to or less than the threshold th, and outputs a distinguished result indicating that the propagation mode is a multipath propagation mode when the difference $|u_{AMAX}-u_{BMAX}|$ exceeds the threshold th.

On the other hand, when there is a directional spectrum $P_C(u_1, u_2)$ indicating a plurality of local maximum points in the directional spectrum $P_C(u_1, u_2)$ obtained by the bidirectional angle measuring unit 122 in step ST1, steps ST1 and ST2 are as follows.

In step ST1, the bidirectional angle measuring unit 122 obtains a difference $|u_1-u_2|$ between the direction-of-departure $u_1$ and the direction-of-arrival $u_2$ corresponding to each of the directional spectra indicating the plurality of local maximum points.

The bidirectional angle measuring unit 122 obtains the direction-of-departure $u_1$ and the direction-of-arrival $u_2$ corresponding to the directional spectrum $P_C(u_1, u_2)$ in which the obtained difference $|u_1-u_2|$ between the direction-of-departure $u_1$ and the direction-of-arrival $u_2$ is minimum as the direction-of-departure $u_{AMAX}$ and the direction-of-arrival $u_{BMAX}$ constituting the bidirectional measured angle value in the reception signal vector of interest x(i).

In step ST2, the propagation mode distinguishing unit 123 compares the difference $|u_{AMAX}-u_{BMAX}|$ between the direction-of-departure $u_{AMAX}$ and the direction-of-arrival $u_{BMAX}$ constituting the bidirectional measured angle value in the reception signal vector of interest x(i) obtained by the bidirectional angle measuring unit 122 with the threshold th for each matched filter output.

As described above, the MIMO radar signal processing device according to the first embodiment includes the bidirectional angle measuring unit 122 that obtains the bidirectional measured angle value constituted by the direction-of-departure $u_{AMAX}$ and the direction-of-arrival $u_{BMAX}$ in the reception signal vector of interest x(i) corresponding to the range Doppler cell given in the target detection processing among the reception signal vectors for the matched filter outputs from the plurality of matched filter banks 121. Therefore, for example, it is possible to obtain the bidirectional measured angle value that can be used to distinguish whether the propagation mode is the direct propagation mode or the multipath propagation mode.

That is, when the bidirectional measured angle value constituted by the direction-of-departure $u_{AMAX}$ and the direction-of-arrival $u_{BMAX}$ in the reception signal vector of interest x(i) obtained by the bidirectional angle measuring unit 122 is used for distinguishing the propagation mode, it is possible to accurately distinguish whether the propagation mode of the reception signal vector of interest x(i) is the direct propagation mode or the multipath propagation mode, and to grasp the propagation environment sensed by the MIMO radar device in more detail.

Furthermore, since the MIMO radar signal processing device according to the first embodiment further includes the propagation mode distinguishing unit that distinguishes whether the propagation mode of the reception signal vector of interest x(i) for the bidirectional measured angle values ($u_{AMAX}$, $u_{BMAX}$) obtained by the bidirectional angle measuring unit 122 is the direct propagation mode or the multipath propagation mode, it is possible to accurately distinguish whether the propagation mode of the reception signal vector of interest x(i) is the direct propagation mode or the multipath propagation mode, and to grasp the propagation environment sensed by the MIMO radar device in more detail.

Second Embodiment

A MIMO radar device according to a second embodiment will be described.

A MIMO radar device according to a second embodiment differs from the MIMO radar device according to the first embodiment in the bidirectional angle measuring unit 122, and the other configurations are the same as or similar to those of the MIMO radar device according to the first embodiment.

Therefore, the bidirectional angle measuring unit 122 will be mainly described below.

When the direction-of-departure (propagation angle $u_1$) and the direction-of-arrival (propagation angle $u_2$) as variables constituting the bidirectional measured angle value in the reception signal vector of interest x(i) are the same, similarly to the bidirectional angle measuring unit 122 in the MIMO radar device according to the first embodiment, the bidirectional angle measuring unit 122 obtains the propagation angle $u_1$ and the propagation angle $u_2$ at which the directional spectrum $P(u_1, u_2)$ (corresponding to directional spectrum $P_C(u_1, u_2)$ of the above Equation (12)) has the maximum value used assuming $u_1=u_2$ in the following Equation (13) by the beamformer method, as the direction-of-departure $u_{AMAX}$ and the direction-of-arrival $u_{BMAX}$ (hereinafter, referred to as the first direction-of-departure $u_{AMAX}$ and the first direction-of-arrival $u_{BMAX}$) constituting the bidirectional measured angle value in the reception signal vector of interest x(i).

$$(u_A, u_B) = \text{argmax} P(u_1, u_2) \tag{13}$$

$$P(u_1, u_2) = \begin{cases} \left| \dfrac{b^H(u_1, u_2) R_{xx} b(u_1, u_2)}{b^H(u_1, u_2) b(u_1, u_2)} \right| & \text{for } u_1 \neq u_2 \\ \left| \dfrac{a_{MIMO}^H(u_1, u_2) R_{xx} a_{MIMO}(u_1, u_2)}{a_{MIMO}^H(u_1, u_2) a_{MIMO}(u_1, u_2)} \right| & \text{for } u_1 = u_2 \end{cases}$$

Equation (13) represents a directional spectrum $P(u_1, u_2)$ used assuming $u_1=u_2$ and a directional spectrum $P(u_1, u_2)$ used assuming $u_1 \neq u_2$.

When the direction-of-departure and the direction-of-arrival as variables constituting the bidirectional measured angle value in the reception signal vector of interest x(i) are different from each other, the bidirectional angle measuring unit 122 obtains a directional spectrum $P(u_1, u_2)$ to be used assuming $u_1 \neq u_2$ in the above Equation (13) by the beamformer method, and obtains a propagation angle $u_1$ and a propagation angle $u_2$ at which the directional spectrum $P(u_1, u_2)$ has the maximum value as a direction-of-departure $u_{AMAX}$ and a direction-of-arrival $u_{BMAX}$ (hereinafter, referred to as a second direction-of-departure $u_{AMAX}$ and a second direction-of-arrival $u_{BMAX}$) constituting the bidirectional measured angle value in the reception signal vector of interest x(i).

In Expression (13), the directional spectrum $P(u_1, u_2)$ used assuming $u_1 \neq u_2$ depends on the multipath steering vector $b(u_1, u_2)$ and depends on the propagation angle $(u_1, u_2)$.

As shown in the above Equation (13), the multipath steering vector $b(u_1, u_2)$ is a sum of a virtual array steering vector $a_{MIMO}(u_1, u_2)$ and a virtual array steering vector $a_{MIMO}(u_1, u_2)$ in which the direction-of-departure $u_1$ and the direction-of-arrival $u_2$ are interchanged with respect to the virtual array steering vector $a_{MIMO}(u_2, u_1)$.

In the above Equation (13), $u_1$ and $u_2$ in the directional spectrum $P(u_1, u_2)$ used assuming $u_1 \neq u_2$ are scan angles, and there is no distinction between the direction-of-departure and the direction-of-arrival.

In short, in the directional spectrum $P(u_1, u_2)$ used assuming $u_1 \neq u_2$ in the above equation (13), the propagation angle $u_1$ and the propagation angle $u_2$ at which the directional spectrum $P(u_1, u_2)$ has the maximum value are obtained as the second direction-of-departure $u_{AMAX}$ and the second direction-of-arrival $u_{BMAX}$ constituting the bidirectional measured angle value in the reception signal vector of interest x(i) with the multipath steering vector $b(u_1, u_2)$ as a variable.

The bidirectional angle measuring unit 122 compares the magnitude relationship between the directional spectrum $P(u_1, u_2)$ according to the first direction-of-departure $u_{AMAX}$ and the first direction-of-arrival $u_{BMAX}$ and the directional spectrum $P(u_1, u_2)$ according to the second direction-of-departure $u_{AMAX}$ and the second direction-of-arrival $u_{BMAX}$, and obtains the propagation angle $u_1$ and the propagation angle $u_2$ of the directional spectrum $P(u_1, u_2)$ having a large value as the direction-of-departure $u_{AMAX}$ and the direction-of-arrival $u_{BMAX}$ constituting the bidirectional measured angle value in the reception signal vector of interest x(i).

The directional spectrum $P(u_1, u_2)$ has a maximum value for the reception signal vector of interest x(i) when the propagation angle $(u_1, u_2)$ indicates the propagation angle of the direct propagation mode in the direct propagation path or the propagation angle of the multipath propagation mode in the multipath propagation path.

That is, the bidirectional measured angle value $(u_{AMAX}, u_{BMAX})$ in which the direction-of-departure is $u_{AMAX}$ and the direction-of-arrival is $u_{BMAX}$ indicates whether the propagation mode of the reception signal vector of interest x(i) is the direct propagation mode or the multipath propagation mode.

Note that the bidirectional angle measuring unit 122 obtains the bidirectional measured angle value $(u_{AMAX}, u_{BMAX})$ by the beamformer method in the above example, but may obtain the bidirectional measured angle value $(u_{AMAX}, u_{BMAX})$ by the MUSIC method or the ESPRIT method.

The propagation mode distinguishing unit 123 obtains a difference $|u_{AMAX}-u_{BMAX}|$ between the direction-of-departure $u_{AMAX}$ and the direction-of-arrival $u_{BMAX}$ constituting the bidirectional measured angle value in the reception signal vector of interest x(i) obtained by the bidirectional angle measuring unit 122, and compares the obtained difference $|u_{AMAX}-u_{BMAX}|$ with the threshold th.

When the difference $|u_{AMAX}-u_{BMAX}|$ is equal to or less than the threshold th, the propagation mode distinguishing unit 123 distinguishes that the propagation mode in the reception signal vector of interest x(i) is the direct propagation mode, and outputs a distinguished result indicating that the propagation mode is the direct propagation mode.

On the other hand, when the difference $|u_{AMAX}-u_{BMAX}|$ exceeds the threshold th, the propagation mode distinguishing unit 123 distinguishes that the propagation mode of the reception signal vector of interest x(i) is the multipath propagation mode, and outputs a distinguished result indicating that the propagation mode is the multipath propagation mode.

Note that the bidirectional angle measuring unit 122 may not compare the magnitude relationship between the directional spectrum $P(u_1, u_2)$ according to the first direction-of-departure $u_{AMAX}$ and the first direction-of-arrival $u_{BMAX}$ and the directional spectrum $P(u_1, u_2)$ according to the second direction-of-departure $u_{AMAX}$ and the second direction-of-arrival $u_{BMAX}$, and the propagation mode distinguishing unit 123 may obtain the difference $|u_{AMAX}-u_{BMAX}|$ between the direction-of-departure $u_{AMAX}$ and the direction-of-arrival $u_{BMAX}$ constituting the bidirectional measured angle value obtained by the bidirectional angle measuring unit 122 for each of the first direction-of-departure $u_{AMAX}$ and the first direction-of-arrival $u_{BMAX}$ and the second direction-of-departure $u_{AMAX}$ and the second direction-of-arrival $u_{BMAX}$ and compare the obtained difference $|u_{AMAX}-u_{BMAX}|$ with the threshold th.

Even in this case, when the difference $|u_{AMAX}-u_{BMAX}|$ is equal to or less than the threshold th, the propagation mode distinguishing unit 123 distinguishes that the propagation mode of the reception signal vector of interest x(i) is the direct propagation mode, and outputs a distinguished result indicating that the propagation mode is the direct propagation mode.

On the other hand, when the difference $|u_{AMAX}-u_{BMAX}|$ exceeds the threshold th, the propagation mode distinguishing unit 123 distinguishes that the propagation mode of the reception signal vector of interest x(i) is the multipath propagation mode, and outputs a distinguished result indicating that the propagation mode is the multipath propagation mode.

Further, when there is a directional spectrum $P(u_1, u_2)$ indicating a plurality of local maximum points in the directional spectrum $P(u_1, u_2)$ used assuming $u_1=u_2$ in the above Equation (13) obtained by using the direction-of-departure $u_1$ and the direction-of-arrival $u_2$ constituting the bidirectional measured angle value in each reception signal vector of interest x(i) as variables and in the directional spectrum $P(u_1, u_2)$ used assuming $u_1 \neq u_2$, the bidirectional angle measuring unit 122 obtains a difference $|u_1-u_2|$ between the direction-of-departure $u_1$ and the direction-of-arrival $u_2$ corresponding to each of the directional spectra $P(u_1, u_2)$ indicating a plurality of local maximum points, and obtains the direction-of-departure $u_1$ and the direction-of-arrival $u_2$ corresponding to the directional spectrum $P(u_1, u_2)$ in which the difference $|u_1-u_2|$ between the direction-of-departure $u_1$ and the direction-of-arrival $u_2$ indicates a minimum as the direction-of-departure $u_{AMAX}$ and the direction-of-arrival $u_{BMAX}$ constituting the bidirectional measured angle value in the reception signal vector of interest x(i).

At this time, the propagation mode distinguishing unit 123 compares the difference $|u_{AMAX}-u_{BMAX}|$ between the direction-of-departure $u_{AMAX}$ and the direction-of-arrival $u_{BMAX}$ obtained by selecting from the directional spectra $P(u_1, u_2)$ indicating a plurality of local maximum points by the bidirectional angle measuring unit 122 with the threshold th.

The MIMO radar signal processing device according to the second embodiment also has effects similar to those of the MIMO radar signal processing device according to the first embodiment.

Further, the MIMO radar signal processing device according to the second embodiment, when the direction-of-departure $u_1$ and the direction-of-arrival $u_2$ are equal, obtains the propagation angle $u_1$ and the propagation angle $u_2$ at which the directional spectrum $P(u_1, u_2)$ has the maximum value as the first direction-of-departure $u_{AMAX}$ and the first direction-of-arrival $u_{BMAX}$ constituting the bidirectional measured angle value in the reception signal vector of interest x(i) using the virtual array steering vector $a_{MIMO}(u_A, u_B)$ as a variable, and when the direction-of-departure $u_1$ and the direction-of-arrival $u_2$ are different from each other, obtains the propagation angle $u_1$ and the propagation angle $u_2$ at which the directional spectrum $P(u_1, u_2)$ has the maximum value as the second direction-of-departure $u_{AMAX}$ and the second direction-of-arrival $u_{BMAX}$ constituting the bidirectional measured angle value in the reception signal vector of interest x(i) using the multipath steering vector $b(u_1, u_2)$ as a variable, and, since the propagation angle $u_1$ and the propagation angle $u_2$ of the directional spectrum $P(u_1, u_2)$ having a large value of the directional spectrum $P(u_1, u_2)$ according to the first direction-of-departure $u_{AMAX}$ and the first direction-of-arrival $u_{BMAX}$ and the directional spectrum $P(u_1, u_2)$ according to the second direction-of-departure $u_{AMAX}$ and the second direction-of-arrival $u_{BMAX}$ are obtained as the direction-of-departure $u_{AMAX}$ and the direction-of-arrival $u_{BMAX}$ constituting the bidirectional measured angle value in the reception signal vector of interest x(i), it is possible to obtain the bidirectional measured angle value in the reception signal vector of interest x(i) without ambiguity even when the grating lobe is included in the beam pattern of the arrival wave RW captured by the reception antenna 2.

As a result, it is possible to more accurately distinguish whether the propagation mode of the reception signal vector of interest x(i) is the direct propagation mode or the multipath propagation mode.

Any component in each exemplary embodiment can be modified, or any component in each exemplary embodiment can be omitted.

INDUSTRIAL APPLICABILITY

The MIMO radar signal processing device according to the present disclosure can be used in a flying object monitoring radar device, an aircraft monitoring radar device, a marine radar device, a ship monitoring radar device, an in-vehicle radar device, an infrastructure radar device, and the like.

REFERENCE SIGNS LIST $\mathbf{1}_1$ to $\mathbf{1}_N$: first transmission antenna to Nth transmission antenna, $\mathbf{2}_1$ to $\mathbf{2}_M$: first reception antenna to Mth reception antenna, 100: MIMO radar signal processing device, 110: transmission signal processing device, $\mathbf{111}_1$ to $\mathbf{111}_N$: first transmission signal generating unit to Nth transmission signal generating unit, 120: reception signal processing device, $\mathbf{121}_1$ to $\mathbf{121}_M$: first matched filter bank to Mth matched filter bank, 122: bidirectional angle measuring unit, 123: propagation mode distinguishing unit

The invention claimed is:

1. A MIMO radar signal processing device comprising:

a plurality of transmission signal generators to generate transmission signals different from each other and output the generated transmission signals to corresponding transmission antennas;

a plurality of matched filter banks, each receiving a reception signal from a reception antenna corresponding to each of a plurality of reception antennas that capture reflected waves obtained by transmission waves transmitted from the transmission antennas, reaching an object and being reflected as arrival waves and transmission signals from the plurality of transmission signal generators, and outputting matched filter outputs serving as vector elements of reception signal vectors using the transmission signals from the plurality of transmission signal generators as a replica of a matched filter;

a bidirectional angle measurer to obtain a bidirectional measured angle value constituted by a direction-of-departure and a direction-of-arrival in a reception signal vector of interest corresponding to a range Doppler cell given in target detection processing among reception signal vectors for matched filter outputs from the plurality of matched filter banks; and a propagation mode distinguisher to distinguish, by the bidirectional measured angle value, whether a propagation mode of a reception signal vector of interest for the bidirectional measured angle value calculated by the bidirectional angle measurer is a direct propagation mode or a multipath propagation mode by comparing the bidirectional measured angle value which is a difference between direction of departure and direction of arrival with a threshold, wherein the bidirectional measured angle value by the bidirectional angle measurer is obtained by obtaining a directional spectrum with a multipath steering vector as a variable, the multipath steering vector being a sum of a virtual array steering vector corresponding to a direction-of-departure and a direction-of-arrival different from each other and a virtual array steering vector obtained by switching a direction-of-departure and a direction-of-arrival with respect to the virtual array steering vector when the direction-of-departure and the direction-of-arrival constituting the bidirectional measured angle value in the reception signal vector of interest as variables are different from each other, obtaining a directional spectrum with a virtual array steering vector corresponding to the same direction-of-departure and the direction-of-arrival when the direction-of-departure and the direction-of-arrival constituting the bidirectional measured angle value in the reception signal vector of interest as variables are the same, and obtaining the direction-of-departure and the direction-of-arrival at which the obtained directional spectrum has a maximum value as the direction-of-departure and the direction-of-arrival constituting the bidirectional measured angle value in the reception signal vector of interest.

2. The MIMO radar signal processing device according to claim 1, wherein the bidirectional measured angle value by the bidirectional angle measurer is obtained by obtaining a direction-of-departure and a direction-of-arrival at which a directional spectrum obtained using a transmission array steering vector related to the transmission signal and a reception array steering vector related to the reception signal as variables indicates a maximum value as a direction-of-departure and a direction-of-arrival constituting the bidirectional measured angle value in the reception signal vector of interest.

3. The MIMO radar signal processing device according to claim 1, wherein the bidirectional measured angle value by the bidirectional angle measurer is obtained by obtaining a direction-of-departure and a direction-of-arrival at which a directional spectrum obtained using a direction-of-departure and a direction-of-arrival constituting the bidirectional measured angle value in the reception signal vector of interest as variables indicates a maximum value, as a direction-of-departure and a direction-of-arrival constituting a bidirectional measured angle value in the reception signal vector of interest.

4. The MIMO radar signal processing device according to claim 1, wherein when there is a directional spectrum indicating a plurality of local maximum points in a directional spectrum obtained by using a direction-of-departure and a direction-of-arrival constituting the bidirectional measured angle value in the reception signal vector of interest as variables, the bidirectional measured angle value by the bidirectional angle measurer is obtained by calculating a difference between a direction-of-departure and a direction-of-arrival corresponding to each of directional spectra indicating a plurality of local maximum points, and obtaining a direction-of-departure and a direction-of-arrival corresponding to a directional spectrum in which the difference between the direction-of-departure and the direction-of-arrival is minimum, as a direction-of-departure and a direction-of-arrival constituting the bidirectional measured angle value in the reception signal vector of interest.

5. The MIMO radar signal processing device according to claim 1, wherein the propagation mode distinguisher compares a value of a difference between a direction-of-departure and a direction-of-arrival constituting the bidirectional measured angle value obtained by the bidirectional angle measurer with a threshold, distinguishes the propagation mode as a direct propagation mode when the value of the difference is equal to or less than the threshold, and distinguishes the propagation mode as a multipath propagation mode when the value of the difference exceeds the threshold.

6. A reception signal processing device of a MIMO radar signal processing device, the reception signal processing device comprising:

a plurality of matched filter banks, each receiving a reception signal from a reception antenna corresponding to each of a plurality of reception antennas that capture reflected waves obtained by transmission waves transmitted from transmission antennas, reaching an object and being reflected as arrival waves and transmission signals from a plurality of transmission signal generators, and outputting matched filter outputs serving as vector elements of reception signal vectors using the transmission signals from the plurality of transmission signal generators as a replica of a matched filter;

a bidirectional angle measurer to calculate a bidirectional measured angle value constituted by a direction-of-departure and a direction-of-arrival in a reception signal vector of interest corresponding to a range Doppler cell given in target detection processing among reception signal vectors for matched filter outputs from the plurality of matched filter banks; and a propagation mode distinguisher to distinguish, by the bidirectional measured angle value, whether a propagation mode of a reception signal vector of interest for the bidirectional measured angle value calculated by the bidirectional angle measurer is a direct propagation mode or a multipath propagation mode by comparing the bidirectional measured angle value which is a difference between direction of departure and direction of arrival with a threshold, wherein the bidirectional measured angle value by the bidirectional angle measurer is obtained by obtaining a directional spectrum with a multipath steering vector as a variable, the multipath steering vector being a sum of a virtual array steering vector corresponding to a direction-of-departure and a direction-of-arrival different from each other and a virtual array steering vector obtained by switching a direction-of-departure and a direction-of-arrival with respect to the virtual array steering vector when the direction-of-departure and the direction-of-arrival constituting the bidirectional measured angle value in the reception signal vector of interest as variables are different from each other, obtaining a directional spectrum with a virtual array steering vector corresponding to the same direction-of-departure and the direction-of-arrival when the direction-of-departure and the direction-of-arrival constituting the bidirectional measured angle value in the reception signal vector of interest as variables are the same, and obtaining the direction-of-departure and the direction-of-arrival at which the obtained directional spectrum has a maximum value as the direction-of-departure and the direction-of-arrival constituting the bidirectional measured angle value in the reception signal vector of interest.

7. The reception signal processing device of the MIMO radar signal processing device according to claim 6, further comprising a propagation mode distinguisher to distinguish, by the bidirectional measured angle value, whether a propagation mode of a reception signal vector of interest for the bidirectional measured angle value calculated by the bidirectional angle measurer is a direct propagation mode or a multipath propagation mode.

8. A method for distinguishing a propagation mode of a reception signal vector of interest for a reception signal obtained by converting arrival waves captured by a plurality of reception antennas, the method comprising:

obtaining a bidirectional measured angle value constituted by a direction-of-departure and a direction-of-arrival in a reception signal vector of interest corresponding to a range Doppler cell given in target detection processing among reception signal vectors for matched filter outputs output from a plurality of matched filter banks, and distinguishing, by the bidirectional measured angle value, whether a propagation mode of a reception signal vector of interest for the bidirectional measured angle value calculated by a bidirectional angle measurer is a direct propagation mode or a multipath propagation mode by comparing the bidirectional measured angle value which is a difference between direction of departure and direction of arrival with a threshold, wherein the bidirectional measured angle value by the bidirectional angle measurer is obtained by obtaining a directional spectrum with a multipath steering vector as a variable, the multipath steering vector being a sum of a virtual array steering vector corresponding to a direction-of-departure and a direction-of-arrival different from each other and a virtual array steering vector obtained by switching a direction-of-departure and a direction-of-arrival with respect to the virtual array steering vector in response to the direction-of-departure and the direction-of-arrival constituting the bidirectional measured angle value in the reception signal vector of interest as variables are different from each other, obtaining a directional spectrum with a virtual array steering vector corresponding to the same direction-of-departure and the direction-of-arrival in response to the direction-of-departure and the direction-of-arrival constituting the bidirectional measured angle value in the reception signal vector of interest as variables are the same, and obtaining the direction-of-departure and the direction-of-arrival at which the obtained directional spectrum has a maximum value as the direction-of-departure and the direction-of-arrival constituting the bidirectional measured angle value in the reception signal vector of interest.

9. The method for distinguishing a propagation mode of a reception signal vector of interest according to claim 8, the method further comprising comparing, a value of a difference between a direction-of-departure and a direction-of-arrival constituting the bidirectional measured angle value obtained with a threshold and distinguishing the propagation mode as a direct propagation mode when the value of the difference is equal to or less than the threshold and distinguishing the propagation mode as a multipath propagation mode when the value of the difference exceeds the threshold.

* * * * *